Dec. 17, 1968  C. G. KALT ET AL  3,416,248
ELECTRO-CHEMICAL OPTICAL DISPLAY
Filed Nov. 2, 1966

3,416,248
ELECTRO-CHEMICAL OPTICAL DISPLAY
Charles G. Kalt, Williamstown, Mass., and Franklin D. Frantz, Jr., Woodford, Vt., assignors to Sprague Electric Company, North Adams, Mass., a corporation of Massachusetts
Filed Nov. 2, 1966, Ser. No. 591,595
12 Claims. (Cl. 40—52)

ABSTRACT OF THE DISCLOSURE

This invention concerns an electro-chemical optical display system in which an indicating electrode immersed in an electrolyte is employed to provide visible indicia by means of electro-tarnishing. Accordingly, a reversible oxidation-reduction reaction is utilized to form a contrasting reaction product on the electrode in response to electrical polarization.

Disclosure

The present invention relates to optical display systems and more particularly to an optical display system employing electro-chemical oxidation-reduction reactions.

Devices which economically convert electrical signals to visible displays are in great demand in modern society. This need varies from the on-off action of simple indicators and signs to high speed alpha-numeric and video displays. Especially, there is a need for compact economical devices which can be operated efficiently in brightly lighted areas and for devices having memory, that is, devices which when switched to a given indication, retain it, until altered. In the prior art, conventional illuminating means, cathode ray tubes, polarizing cells and electro-chemical plating cells have been employed for optical displays. However, each has disadvantages such as low contrast, low efficiency, high cost, excessive thermal output and short memory.

It is an object of this invention to provide a compact, economical and highly versatile electro-chemical display system having a wide and controllable range of optical contrast.

It is another object of this invention to provide an electro-chemical display which is effective under high ambient light conditions and has memory.

These and other objects will be apparent upon consideration of the following specification taken in conjunction with the drawing in which.

In general, an electro-chemical display device provided in accordance with the invention comprises an electrode which is immersed in an electrolytic medium and is capable of forming with the electrolyte, upon application of a potential of the proper polarity, a reaction product which is in substantial optical contrast to the reduced electrode surface so as to provide visible indicia.

Preferably an electrode of the group consisting of Ag, Cu, Ni, Mn and Fe is employed with electrolytes which supply anions of sulfide, arsenate, chromate, and ferrocyanide since these provide reaction products of high contrast. A counter electrode of either reactive material or non-reactive material may be employed to complete the electrical circuit.

In one embodiment the counter electrode is included as an indicating electrode by constructing it of contrasting reactive material which is within the view of an observer. More than one type of reactive material, whose reaction products contrast with that of each other may also be employed in a further embodiment, as separate electrodes, or combined within the same electrode.

In still further embodiments, a matrix of electrodes, or cells, suitable for a variable display of information is provided, as well as an array of crossed electrodes in a coincident current arrangement.

Figure 1:
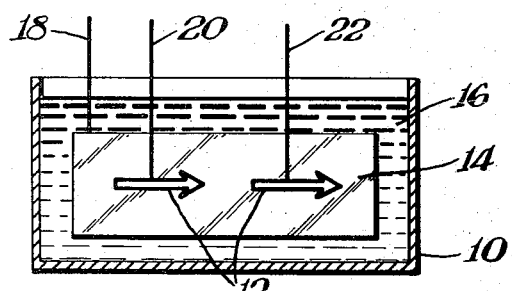
FIGURE 1 illustrates an embodiment of the invention in which a counter electrode is employed as background for an indicating electrode.

Referring now to FIGURE 1 wherein is shown a transparent container 10 enclosing a pair of indicating electrodes 12 which are positioned in front of a large background electrode 14 and immersed in an electrolyte 16.

Lead wires 18, 20 and 22 connect to each electrode to provide for application of electrical potential to the electrodes, which will cause a reaction product to form (or dissociate, depending upon the electrical polarity) at, or with, electrodes 12. The indicating electrodes 12 or a surface film over them are made of material which will provide with the electrolyte, under the above circumstances, a reaction product which is in substantial contrast to its unreacted surface state so as to provide a visible or optical change.

As used herein, the term reaction product is defined as a chemical compound resulting from a combination of the electrode and electrolyte by any means, mechanism or chemical action such as, for example, by oxidation and does not include deposit products such as plating or the like. The term reaction product is also intended to include any compound, so formed, whether optically contrasting to the non-reacted state, or not.

Consequently, active or reactive material is defined herein as one capable of forming any such reaction product (contrasting or not) and conversely non-reactive material is one which is substantially inert in the system or does not otherwise form the aforementioned reaction product.

Broadly, the mechanism employed may be termed an electrochemical oxidation-reduction reaction or electro-tarnishing or the like. In any case, the system operates to provide visible indicia by creating or eliminating an optically contrasting reaction product under electrical control.

Many different materials are useful for the indicating electrodes and the electrolyte. Thus Ag, Cu, Ni, Mn, Fe and possibly Cr or other materials which form reaction products having different optical absorption or reflectively, or otherwise suitably contrast to the non-reacted state, are suitable.

In one embodiment, silver is employed for the indicating electrodes 12 and a non-reactive material such as graphite as the counter electrode 14. The electrolyte is such as to supply anions which form a suitable (optically contrasting) reaction product at the active electrode surfaces. For example, various sodium or potassium salts, such as sodium sulfide provide suitable anions.

Accordingly upon application of a potential of suitable polarity, the sulfide anion will react with the silver electrode surface to provide thereat a black reaction product of silver sulfide; whereas arsenate and chromate anions provide dark red; and ferrocyanide provides an orange surface film; all of which contrast to the white, or bright silver, surface of the electrode in its non-reacted or reduced state. In this way, the optical display utilizes a reversible oxidation-reduction process or the like to convey information by converting electrical signals to visible indicia.

In the embodiment illustrated in FIGURE 1, active electrodes 12 of Ag, or the like, are immersed in a suitable electrolyte such as $Na_2S$ or NaHS dissolved in $H_2O$; and the counter electrode is graphite or other non-reactive substance. By application of the proper polarity, the surface of electrode 12 may be oxidized to black $Ag_2S$ so as to blend with the background electrode 14, or reduced to white so as to provide a suitable indicator of high contrast.

Upon application of an electric potential such that electrons flow from indicating electrodes 12 to counter electrode 14 through the electrolyte, the reaction product which coats the silver electrode is dissociated and the surface of the Ag electrode changes from black to white, as S of the $Ag_2S$ surface film goes into solution as $S^{--}$ ions. Subsequently when the polarity is reversed, the indicating electrode changes from white to black as the S ions recombine with the active electrodes at their surfaces.

In this arrangement, the contrast is enhanced by providing a background for the reactive electrode, which is similar to one of its surface states. For example, either black or silver background is suitable. In either case, a highly versatile display, which utilizes reflected light and consequently is optically efficient in brightly lit areas, is provided. It is also evident, however, that the device may be illuminated for use in low ambient light conditions.

Since the speed of the reaction is a function of throwing power, shading, surface area and distance between electrodes, etc., relatively fast reactions, in the order of milliseconds, are possible by adjusting system parameters. In FIGURE 1, for example, electrode 12 is formed as an outline of silver wire which provides a short path, through the electrolyte, between the indicating electrode 12 and the counter electrode 14, behind it.

Many different embodiments are possible. For example, multiple active electrodes as shown in FIGURE 1 are suitable and may be simultaneously reacted, or sequentially operated; in which case the potential is alternately applied to each active electrode such that each is made to contrast with the background and each other, at different time intervals. The active electrode may form only an outline, or be a full surface electrode as shown in FIGURE 2, and in the latter case, a porous or foraminous electrode may be employed, or it may be desirable to space counter electrodes 24 and 26 to either side of the active electrode 28, as shown, so as to provide a short reaction path through the electrolyte.

Figure 2:
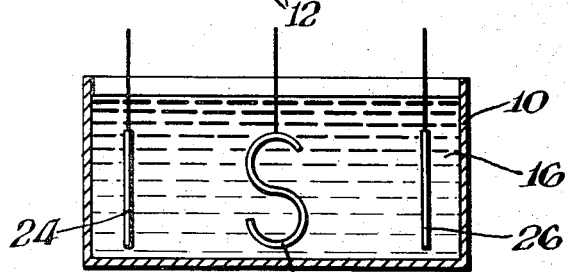
FIGURE 2 represents a further embodiment of the invention in which counter electrodes are spaced to one side of an indicating electrode.

Advantageously the structure illustrated in FIGURE 2, in which one electrode 24 is to one side of the indicating electrode 28, may also provide a gradual change since the reaction will be initiated at the closest portions of the electrode 28 and progressively spread to its furthest portion.

The indicated reaction persists, in most cases, long after the pulse has been removed and can be retained indefinitely by the application of a small bias. The persistance time, or the bias necessary to continue it indefinitely, is dependent upon various parameters of the system, such as the electrolyte and electrode materials. The bias can, of course, be employed to hold the system in either the "on" or "off" state.

Furthermore, in any embodiment, the indicating electrode may be made wholly from reactive material or the latter provided as a thin surface coating over an inert base so that the reaction is limited to the electrode surface. For example, instead of a solid silver electrode, for which the reaction will continue to unnecessary depths as long as potential is applied and which will build up excessive reaction product layers having low adhesion to the electrode, a thin silver plate may be employed over a non-reactive base such as nickel, or the like. Similarly, any electrode base may be sealed with a non-reactive coat of rhodium, or the like, which is then coated with a thin reactive layer. Advantageously, the active plate may be applied in any configuration on a suitable base or in combination with different reactive platings, which contrast with each other in either, or both, the reacted or non-reacted state.

Some gassing of the $Ag-Ag_2S$ system at the non-reactive counter electrode is to be expected during the forming of the reaction product over the active electrode. Thus, with the counter electrode cathodic and the active electrode anodic hydrogen evolution at the inert carbon electrode will be evident. Gassing may also be expected at the active electrode once reduction is complete, and in either case, gassing will be aggravated at higher voltages.

This leads, of course, to a loss of the electrolyte and a shorter life of the unit. However, reasonably long life is still possible (in the order of a thousand hours) and the life may be prolonged indefinitely in many cases by the addition of water, or gas suppressing agents, as for example, redox materials such as quihydrone.

Since gas formation at the cathode is usually due either to the discharge of a proton to give a hydrogen atom, or to the discharge of some species to give a product which reacts with the solvent to give a hydrogen atom, two additional methods for suppressing this formation are: the addition of a readily reducible substance which will react with the hydrogen atoms generated; and the use of a system in which the solvent is aprotic and the only cations present are appropriately substituted quaternary ammonium ions.

This latter approach is the more promising one. Some typical aprotic solvents are dimethylformamide, propylene carbonate and dimethylsulfoxide. The quaternary ammonium cation should have at least one R group which when cleaved as a radical can be stabilized by electron delocalization. Some appropriate cations are allyltrimethylammonium ion, benzyltrimethylammonium ion, cinnamyltriethylammonium ion and tetrallylammonium ion. For this method to be successful the quaternary ammonium ion must have a lower discharge potential than hydrogen ion in the solvent chosen.

Both of these latter expedients involve irreversible reactions, however, and thus, the ability of the system to suppress cathodic hydrogen formation will end when sufficient charge has been passed to consume the quaternary ammonium ions, or when the reducible substance has been completely reduced. These approaches are not mutually exclusive, however, and may be used simultaneously.

Advantageously, gassing at the counter electrode may also be alleviated by constructing the counter electrode of active rather than inert material, such that a reaction product is alternately formed on each electrode.

In this construction, the active counter electrode may also serve as an indicating electrode or not, as preferred. The counter electrode material, for example, may be active but not optically contrasting; that is of material whose reaction product in the particular electrolyte system is not optically contrasting to its non-reacted state. Furthermore, optically reactive material may be employed with the electrode hidden from view, as to the side of the indicating electrode as shown in FIGURE 2, in which case a transparent window (not shown) is provided only in front of the electrode which is to be observed.

It should be understood, however, that outgassing may still occur even in the case where active counter electrodes are utilized, if the electrical potential is continued after complete dissociation has occurred. This may be eliminated by utilizing heavily reacted, large area, electrodes which are not completely dissociated during cycling. By suitable construction, visible portions of the electrodes may be made to react first, while large hidden portions of the same electrode continue to react to dissipate any electrical overshoot. For example, the indicating electrode may have a pear shaped cross section, or otherwise have a forward portion of high curvature and a rear portion of low curvature. Counter electrodes could be spaced to either side, close to the forward portion of the indicator, so as to further enhance initial reaction at that point.

Under these circumstances, dissociation will originate at the visible high curvature part of the electrode and proceed towards the hidden low curvature portion. In this way, any overshoot of the electrical pulse will operate on reacted areas of the electrode rather than reduced areas, and thus, reduce gassing.

In addition, the active counter electrode may be formed from reactive but non-indicating material, that is one whose reaction product is not substantially in contrast with its reduced state (as for example, manganese and its various oxide coatings) so that a relatively unchanging background may be provided by the active counter electrode.

However, more informative or more decorative displays may result in arrangements where an active counter electrode is also employed as an indicating electrode. For example, if the counter electrode, which serves as a background in FIGURE 1, is made of silver or similar optically reactive material (having contrasting reacted and no-reacted states) both positive and negative optical displays will be realized during each cycle.

Furthermore, two different active materials may also be utilized in this case to provide other than a mere negative display. For example, if a silver electrode is employed in a chromate electrolyte with a lead counter electrode as a background, the oxidation product which forms on the counter electrode, is bright yellow at the time the silver electrode is white-silver, and is dark grey when the latter electrode is black. In this embodiment, both electrodes are indicating electrodes, of course.

Further combinations are also possible. In the given example, the lead and silver could be combined in a single electrode, in a particular pattern, as a thin coating or otherwise, and any counter electrode employed. Then both yellow and black reaction products would be formed at the same time on the same electrode in contrast to its black and grey non-reacted state.

Many other arrangements may also be provided, and in any case, the electrodes whether plated or not may be mere outlines or full planar surfaces of solid or foraminous material.

Figure 3:
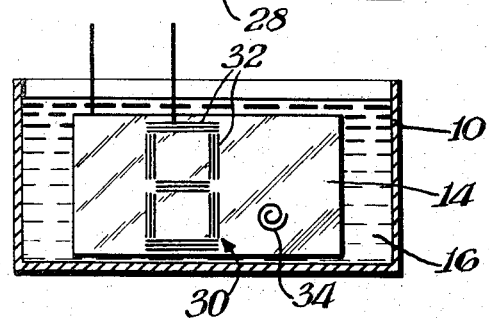
FIGURE 3 illustrates a further embodiment of the invention suitable for alpha-numerical representations.

Alpha-numerical characters may also be provided by various modifications of the active electrodes. For example, as shown in FIGURE 3, a group of active electrodes 30 may be employed in a variable alpha-numerical arrangement to form indicia from various electrical operations of electrode elements 32.

In this embodiment, each element 32 is composed of one or more parallel wires, electrically connected to each other and having an extended conductor or lead (not shown). By switching various combinations of elements between the reduced and oxidized state, white to black in the case of silver and its sulphide, a composite number may be visibly perceptible. A further element 34, made up of a spiral of silver wire coils may be employed as a decimal point in the numeric display.

The indicated wires may be suspended in the electrolyte in a number of ways, as for example, by mounting on a transparent insulative sheet, such as glass or the like, or any insulator which will suitably blend with the background. The counter electrodes may be suitably provided as wires mounted on the same sheet adjacent the indicators, with connection made to both through the back of the sheet.

Figure 4:
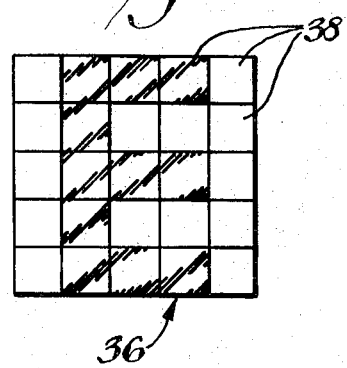
FIGURE 4 illustrates a matrix of electro-chemical cells in accordance with the invention.

A highly versatile display may also be provided by employing a matrix of cells or electrodes as shown in FIGURE 4, from which alpha-numerical characters and pictorial representations may be created by appropriate combination of cells or electrodes. The matrix 36 is formed by a number of individual cells 3, or electrodes, in side by side arrangement so that indicia is provided by forming reaction products on some of the electrodes in contrast to adjacent non-reacted electrodes. The letter "E" is illustrated as an example of alpha-numerical representations possible.

Many modifications of the cell matrix are possible. As indicated, the array can be provided by individual cells in which each indicating electrode forms a large portion of the full face of its respective cell. Additionally, rather than separate cells, one large unit may be provided with a transparent face plate having cell-like cubicals open to the interior of the unit and with indicating electrodes within each cubicle.

The counter electrodes in such case may be hidden behind the others, or may be a number of interconnected electrodes positioned beside each indicating electrode in alignment with the cell intersections. For example, the side walls of the cells may be counter electrodes placed endwise to the line of sight. This cellular structure is advantageous since it lowers the impedance of each cell, and allows shorter reaction time.

As indicated, in this array any of the indicating electrodes may be polarized positive with respect to the counter electrode, while the remainder are polarized negative, so as to provide contrast to adjacent areas, and thus the desired indicia.

Figure 5:
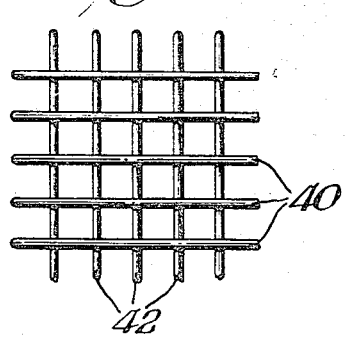
FIGURE 5 illustrates a coincident current electrode array provided in accordance with the invention.

Another modification, as shown in FIGURE 5, consists of an array of horizontal wires 40, spaced from each other in a plane in front of a similar array of vertical leads 42. The forward array, leads 40 in this case, are the indicating electrodes and are formed of active material, such as Ag and the like, whereas the vertical leads, or counter electrodes 42, may be formed of any conducting material. By providing appropriate polarity to each lead, various displays may be formed, since the electrolytic reaction will be concentrated between leads at the point of lowest impedance; that is the area of intersection of the leads, thereby giving an electro-chemical coincident current display having inherent memory.

By means of external switching circuitry, it is possible to control the optical contrast of each intersection of the indicating electrode and counter electrode wires to provide alpha-numerical, or video presentations. The latter, of course, generally requires a reaction time of a fraction of a microsecond for each point of the composite picture, whereas the reaction of a given cell (or intersection point) is in the order of a millisecond.

This apparent incompatability is overcome in the coincident current array by the inherent storage of each cell due to the capacitance between electrodes. This can be further enhanced by constructing the counter electrode wire with a large surface area (either by going to etched surface construction or by using porous material) so that a considerable capacitance is developed in each cell between the indicating and counter electrodes.

This capacitor is charged by the video pulse at a rapid rate, since the charging time constant is very small, and is then discharged across the resistance of the $Ag_2S$ film and the electrolyte impedance, which together form a time constant long enough to permit the cell to undergo its electro-chemical actions. Thus, the electro-chemical action, which takes place in the order of a millisecond can still be driven at video rates and provide a video display.

One advantage of this system is that the image memory of the raster makes possible new scanning methods which require less bandwidth than conventional video. The inherent memory of the device (in most embodiments, any display substantially remains long after the electrical pulse that created it) makes it suitable for wide variety of electronic displays.

Furthermore, the device can be manufactured in a flat, picture frame arrangement suitable for wall or portable television, or other electrically controlled display.

As indicated, many different modifications are possible. Various materials may be utilized for the electrodes and electrolyte, along with varied structural and geometrical configuration. In addition, both liquid and gelled electrolytes are useful, and even solid electrolytes may possibly be employed.

Thus, it will be understood that the above described embodiments of the invention are for purposes of illustration only, that many modifications may be made without departing from the spirit of the invention described herein, and that the invention is to be limited only by the scope of the appended claims.

What is claimed is:

1. An electro-chemical display device for providing visible indicia upon the application of a potential of the proper polarity, which comprises: a plurality of spaced apart electrodes; an electrolytic medium disposed between said electrodes; and at least one of said electrodes being an indicating electrode having a reactive surface, said reactive surface forming a reaction product with the electrolyte by electro-tarnishing upon application of said potential between said indicating electrode and a counter electrode; and said reaction product being in substantial contrast to the non-reacted surface state of said indicating electrode for providing said visible indicia.

2. A device as claimed in claim 1 wherein said reactive surface is of the group consisting of Ag, Cu, Ni, Mn and Fe.

3. A device as claimed in claim 1 wherein said electrolyte contains at least one ion from the group consisting of sulphide, arsenate, chromate and ferrocyanide.

4. A device as claimed in claim 1 wherein said electrolyte contains a gas suppressing agent.

5. A device as claimed in claim 1 wherein said reactive surface is a substantially thin surface coating overlying a non-reactive surface.

6. A device as claimed in claim 1 including a plurality of said indicating electrodes and a plurality of said counter electrodes respectively arranged in spaced parallel relation in substantially parallel planes with said indicating electrodes disposed at an angle to the counter electrodes in a crossed array.

7. A device as claimed in claim 1 including a counter electrode having a non-reactive surface.

8. A device as claimed in claim 1 wherein said counter electrode has a reactive surface capable of forming a reaction product.

9. A device as claimed in claim 1 in which said electrolyte is a gelled material.

10. A device as claimed in claim 1 including at least one other indicating electrode having a reactive surface capable of forming a reaction product, and said other electrode having at least one surface state which is in visible contrast to a surface state of said first electrode.

11. A device as claimed in claim 10 wherein said reaction product of said one electrode is in substantial contrast to that of said other electrode.

12. A device as claimed in claim 10 wherein said reactive surfaces having said contrasting surface states are combined in a single electrode.

References Cited

UNITED STATES PATENTS 3,076,187  1/1963  Bichell et al.
3,096,271  7/1963  Hespenheide _____ 204—231 X

OTHER REFERENCES

"Reactions of Anions and Cations" by W. L. Estabrooke, 1923, page 63 relied on.

"Electrochemistry" by Edmund C. Potter, 1956, page 17 relied on.

EUGENE R. CAPOZIO, *Primary Examiner.*

W. GRIEB, *Assistant Examiner.*

U.S. Cl. X.R.

204—231; 340—352